United States Patent Office 2,778,327
Patented Jan. 22, 1957

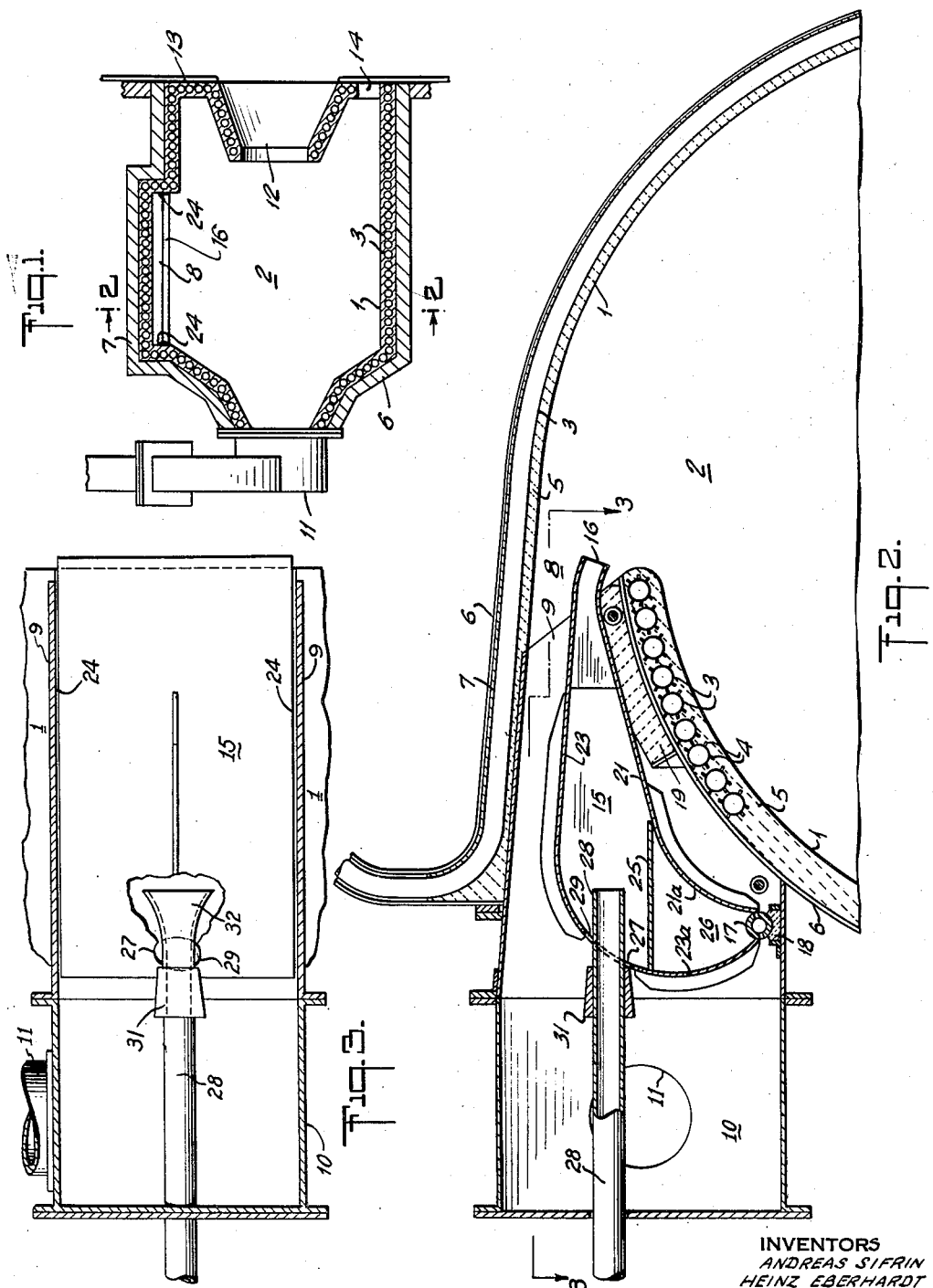

2,778,327

CYCLONE FURNACE

Andreas Sifrin, Heinz Eberhardt, and Hermann Hennecke, Oberhausen, Rhineland, Germany, assignors to The Babcock & Wilcox Company, New York, N. Y., a corporation of New Jersey Application February 27, 1953, Serial No. 339,306

7 Claims. (Cl. 110—28)

The present invention relates to fuel burning apparatus and more particularly to the construction and operation of a cyclone type furnace for burning ash-containing solid fuel whereby, with the fuel supplied to the furnace in reduced particle size, the combustion is accompanied by a high rate of heat release per cubic foot of furnace volume so as to maintain furnace chamber temperatures above the ash fusion temperature and thereby permit the removal of ash as a liquid slag.

In the operation of cyclone furnaces in general, as disclosed for example in U. S. Patent 2,594,312, wherein the combustion chamber is of generally cylindrical formation throughout its length, the reduced fuel and air are introduced tangentially into the combustion chamber at one end so as to provide a high velocity whirling stream of fuel and air which travels in a helical path along the circumferential wall of the furnace. Additional air, known as secondary air, is introduced tangentially, usually at a location intermediate the ends of the furnace, so as to merge with the burning stream of fuel and primary air. Combustible constituents of the fuel burn with a high rate of heat release, and with the development of temperatures above the fusing temperature of the ash, whereby the fuel is rapidly reduced to gaseous products of combustion which are discharged from the furnace through a central throat passage at one end and to molten slag which drains down along walls of the furnace and through a bottom slag outlet.

In certain forms of cyclone furnaces heretofore known, a primary air-fuel mixture is directed into a conduit through which air for combustion is supplied to the furnace, the mixture being introduced through an oscillatable nozzle which opens into the air stream within the discharge end portion of the conduit. Another known expedient is the provision, at the outlet of an air supply passage, of a guide-tongue or damper for unilateral adjustment of the effective cross-section of the outlet. However, it is difficult to provide both of these expedients simultaneously at the outlet of an air passage because the two arrangements would restrict one another spatially and in their method of operation. According to the invention, therefore, the guide-tongue or damper itself is made in the form of an oscillatable fuel-nozzle.

The various features of novelty which characterize our invention are pointed out with particularly in the claims annexed to and forming a part of this specification. For a better understanding of the invention, its operating advantages and specific objects attained by its use, reference should be had to the accompanying drawings and descriptive matter in which we have illustrated and described a specific embodiment of our invention.

Of the drawings:

Fig. 1 is a side elevational view, mainly in section, of a cyclone furnace providing an embodiment of the invention;

Fig. 2 is an enlarged transverse sectional view of a part of the furnace, as seen along line 2—2; and Fig. 3 is a sectional plan view of Fig. 2, taken along line 3—3, and partly broken away.

The cyclone furnace herein illustrated is essentially a horizontally inclined cylinder of fluid cooled wall construction and, except for certain specific features hereinafter described, is of the general type disclosed in the aforesaid U. S. Patent 2,594,312. The enclosing walls of the cyclone furnace include a fluid cooled circumferential wall 1 defining a combustion chamber 2 of generally circular cross section about a central axis which, for example, is horizontally arranged. The wall 1 includes fluid conducting tubes 3 which on the fire-side are provided with studs 4 welded thereto, and lined with heat refractory material 5 in which the tubes and studs are embedded to form a closed wall. A heat-insulated metal casing 6 is suitably arranged at the outer side of the wall. A circumferential furnace wall portion 7, of generally scroll-like formation and spaced from at least one end of the furnace, is extended beyond an inner wall portion 1 so as to overlap and define therewith a rectangular opening or port 8 in which is installed an inwardly tapering nozzle 9 through which secondary air for combustion is directed tangentially into the chamber, the air being received in preheated condition through an exterior supply conduit 10 to which such air is supplied, suitably through inlet 11. A fluent fuel-air mixture is introduced tangentially at approximately this same location in a manner to be presently explained. Additional air may be introduced axially in a whirling stream from a housing 11 at the front end of the furnace. The resulting gases of combustion are discharged from the opposite rearward end of the furnace through a central gas outlet 12 which is defined by a reentrant throat section of the end wall 13. A slag outlet 14 is provided below the gas outlet 12.

A hollow tongue, or fuel-directing nozzle member 15, suitably of progressively decreasing rectangular cross section toward one end, and terminating in a nozzle tip 16 of reduced cross section at that end, is arranged within air-nozzle 9 for angular movement about a pivot support 17 located adjacent the inner, bottom wall of nozzle 9, in parallel relation to the axis of curvature of furnace wall 1. The pivot support structure 17 is sealed to the inner wall of nozzle 9 by means including packing material 18 in order to confine air flow through nozzle 9 to the space between tongue 15 and the outer furnace wall portion 7. Suitable operating means, not shown, are provided for rotating the tongue into different positions of adjustment radially within the secondary air port 8, in which positions the nozzle tip 16 is directed slightly inward with respect to the inner curved surface of furnace wall 1. A refractory block 19 is secured to wall 1, at the outer side thereof, to form a stop for nozzle member 15 in a predetermined position of inward movement.

The pivoted tongue or nozzle member 15 is formed with inner and outer material-directing wall portions 21 and 23 extending between parallel nozzle walls which, as shown in Fig. 3, are disposed at opposite sides closely adjacent the opposing end walls 24, 24 of air nozzle 9 so as to substantially prevent the leakage of air therebetween. Suitably, toward the discharge end of member 15, the inner and outer wall portions 21 and 23 are arranged in converging relation and, at the opposite fuel inlet end, are formed with portions 21a and 23a which are curved downwardly in converging relation toward the bottom location of the pivot support 17. An interior wall means, forming partition plate 25, extends between wall portions 21a and 23a, parallel to the pivot support 17, to provide at one side a fuel-directing nozzle surface and, at its opposite side, to close off an inactive space 26 adjacent the pivot support 17.

In a rear wall portion of nozzle member 15, at a location radially outward from the partition plate 25, where a portion of nozzle wall 23, during rotation of the nozzle, moves substantially parallel to the outer boundary of air nozzle 9, there is formed a substantially circular opening 27 through which extends a fuel-delivery pipe 28 of smaller diameter than the opening 27 so as to leave about pipe 28 a surrounding annular air-inlet space 29 providing direct communication between the interior of air supply conduit 10 and the interior of nozzle member 15, above plate 25. On the pipe 28, exteriorly of member 15, there is slidably mounted an annular plug 31 of conical exterior form for movement into space 29 for regulating the flow of air therethrough into the nozzle member 15.

During operation of the cyclone furnace, a substantial proportion of the combustion air is admitted through conduit 10 at a relatively high pressure, while a fluent mixture of granular fuel and air is admitted at high pressure through pipe 28 which, at its discharge end, is symmetrically widened or flared, as at 32, suitably in a generally horizontal direction, parallel to the central axis of chamber 2. Although the fuel-air mixture is discharged at high velocity from pipe 28, its velocity within the hollow tongue or nozzle member 15 is greatly reduced, so that its discharge velocity through the nozzle tip 16 is relatively low. For this reason, provision is made for admitting through opening 27, a regulable supply of additional air into the interior of member 15 for increasing the velocity at which the fuel-air mixture is discharged through nozzle tip 16. If the nozzle member 15 should be swung outwardly, that is, in a counter-clockwise direction from the position shown in the drawing, the effective cross sectional area of air nozzle 9 is reduced without effecting a variation in flow area of the fuel nozzle 16. Moreover, the flow rate of fuel into the combustion chamber 2 may be separately regulated, irrespective of the position to which the fuel nozzle 16 may be adjusted.

As will be understood, the rectangular port 9 instead of being continuous as shown, may be transversely divided into longitudinally successive sections, and a separate nozzle member, similar to member 15, installed in each section so as to permit separate adjustment of fuel and air delivery through the respective port and nozzle sections thus provided.

While in accordance with the provisions of the statutes we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of other features.

We claim:

1. In a cyclone furnace having a circumferential boundary defining a combustion chamber of generally circular cross section about a central axis, said boundary at a location spaced from one end of said chamber being of scroll-like formation and defining an air inlet port elongated in a direction parallel to said axis and opening into said chamber in tangential relation to said circumferential boundary, means for introducing a fluent fuel-air mixture into said chamber comprising a nozzle member disposed within said inlet port and terminating in a discharge tip adjacent the inner end of the port, support means for said nozzle member arranged for pivotal adjustment thereof toward and away from said circumferential boundary and thereby with respect to the radially inner and outer walls of said port, and means for directing air into said chamber through a space separating said nozzle member from said boundary.

2. In a cyclone furnace as defined in claim 1, the combination which further includes a conduit through which the fuel-air mixture is delivered to the interior of said nozzle member, said conduit extending through a wall of said nozzle member and forming the effective inner margin of an opening in said wall through which air is admissible to the interior of said nozzle member.

3. In a cyclone furnace having a circumferential boundary defining a combustion chamber of generally circular cross section about a central axis, said boundary at a location spaced from one end of said chamber being of scroll-like formation and defining an inlet port of generally rectangular cross section elongated in a direction parallel to said axis and opening into said chamber in tangential relation to said circumferential boundary, means for introducing into said chamber a fluent fuel-air mixture comprising solid fuel particles in suspension, said means including a nozzle member disposed within said inlet port and terminating in a discharge tip adjacent the inner end of the port, said discharge tip being elongated in a direction longitudinally of said chamber and having radially inner and outer walls arranged substantially parallel to said axis, support means arranged for angular adjustment of said nozzle member relative to said circumferential boundary so as to vary the position of said tip radially with respect to said port, said support means providing a pivotal axis arranged parallel to said circumferential boundary at the location of said port, and means for directing air tangentially into said chamber through a space substantially restricted to that part of said inlet port disposed at the radially outer side of said nozzle member.

4. In a cyclone furnace having a circumferential boundary defining a combustion chamber of generally circular cross section about a central axis, said boundary at a location spaced from one end of said chamber being of scroll-like formation and defining an inlet port of generally rectangular cross section, a nozzle installed within said port for directing air into said chamber in tangential relation to said boundary, means for introducing into said chamber a fluent fuel-air mixture comprising solid fuel particles in suspension, said means including a fuel nozzle pivotally supported within said air directing nozzle and terminating in a discharge tip adjacent the inner end of said inlet port, support means for said fuel nozzle arranged for pivotal adjustment thereof within said air nozzle and relative to said circumferential furnace boundary while normally maintaining a space separating said tip from said boundary, and means for directing air into said chamber through that part of said inlet port by which said fuel nozzle tip is separated from the outer circumferential wall of said air nozzle.

5. In a cyclone furnace as defined in claim 4, the combination which further includes a conduit through which the fuel-air mixture is delivered to the interior of said fuel nozzle, said conduit extending into said fuel nozzle through a wall opening providing clearance space adjacent said conduit through which opening air is admissible to the interior of said fuel nozzle, and means for regulating the effective flow area of said clearance space.

6. In a cyclone furnace, the combination as defined in claim 5 and further including wall means interiorly of the fuel nozzle for restricting fuel flow therethrough substantially to a path directly connecting said fuel delivery conduit with said fuel discharge tip.

7. In a cyclone furnace, the combination as defined in claim 6 wherein said fuel delivery conduit is widened at its discharge end in a direction parallel to said central axis.

References Cited in the file of this patent

UNITED STATES PATENTS

| 2,243,909 | Kruger | June 3, 1941 |
| 2,594,312 | Kerr et al. | Apr. 29, 1952 |

FOREIGN PATENTS

| 363,396 | Great Britain | Dec. 11, 1931 |